United States Patent [19]

Haley et al.

[11] 4,175,956
[45] Nov. 27, 1979

[54] ELECTROPHOTOSENSITIVE MATERIALS FOR MIGRATION IMAGING PROCESSES

[75] Inventors: Neil F. Haley, Fairport, N.Y.; James J. Krutak, Kingsport, Tenn.; Robert J. Ott, Rochester, N.Y.

[73] Assignee: Eastman Kodak Company, Rochester, N.Y.

[21] Appl. No.: 876,795

[22] Filed: Feb. 10, 1978

[51] Int. Cl.$^2$ .............................................. G03G 17/04
[52] U.S. Cl. ....................................... 430/37; 542/429; 542/430; 542/431
[58] Field of Search ..................... 96/1 PE, 1.3, 1.5 R; 204/180; 252/501

[56] References Cited

U.S. PATENT DOCUMENTS

| | | | |
|---|---|---|---|
| 3,140,182 | 7/1964 | Heseltine et al. | 96/106 |
| 3,383,993 | 5/1968 | Yeh | 96/1 PE |
| 3,617,270 | 6/1969 | Kampter | 96/1.7 |
| 3,824,099 | 7/1974 | Champ et al. | 96/1.5 |

*Primary Examiner*—Roland E. Martin, Jr.
*Assistant Examiner*—John L. Goodrow
*Attorney, Agent, or Firm*—John R. Everett

[57] ABSTRACT

Electrophotosensitive materials having the structure

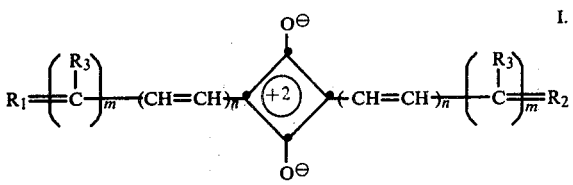

is disclosed wherein
$R_1$ and $R_2$, which may be the same or different, represent a monovalent or divalent substituted or unsubstituted 5 to 13 member heterocyclic nucleus or a substituted or unsubstituted 5 to 10 member saturated or unsaturated carbocyclic nucleus and said hetero atom is selected from the group consisting of O and N;
$R_3$ represents H, alkyl, aryl, or cyano and carboxyesters;
m represents 0 or 1;
n represents 0, 1, 2 or 3; and
said substituted $R_1$ and $R_2$ substituents are selected from the group consisting of alkyl, hydroxy, phenyl, oxo, benzyl, carbamoyl, acetamido, nitro, piperidinyl, halo, and substituted amino.

3 Claims, 1 Drawing Figure

ELECTROPHOTOSENSITIVE MATERIALS FOR MIGRATION IMAGING PROCESSES

FIELD OF THE INVENTION

This invention relates to electrophoretic migration imaging processes and to photosensitive pigment materials used in such processes.

BACKGROUND OF THE INVENTION

In the past, there has been extensive description in the patent and other technical literature of electrophoretic migration imaging processes. For example, a description of such processes may be found in U.S. Pat. Nos. 2,758,939 by Sugarman issued Aug. 14, 1956; 2,940,847, 3,100,426, 3,140,175 and 3,143,508, all by Kaprelian; 3,384,565, 3,384,488 and 3,615,558, all by Tulagin et al; 3,384,566 by Clark; and 3,383,993 by Yeh. In addition to the foregoing patent literature directed to conventional photoelectrophoretic migration imaging processes, another type of electrophoretic migration imaging process which advantageously provides for image reversal is described in Groner, U.S. Pat. No. 3,976,485 issued Aug. 24, 1976. This latter process has been termed photoimmobilized electrophoretic recording or PIER.

In general, each of the foregoing electrophoretic migration imaging processes typically employs a layer of electrostatic charge-bearing photoconductive particles, i.e., electrically photosensitive particles, positioned between two spaced electrodes, one of which may be transparent. To achieve image formation in these processes, the charge-bearing photosensitive particles positioned between the two spaced electrodes, as described above, are subjected to the influence of an electric field and exposed to activating radiation. As a result, the charge-bearing electrically photosensitive particles are caused to migrate electrophoretically to the surface of one or the other of the spaced electrodes, and one obtains an image pattern on the surface of these electrodes. Typically, a negative image is formed on one electrode, and a positive image is formed on the opposite electrode. Image discrimination occurs in the various electrophoretic migration imaging processes as a result of a net change in charge polarity of either the exposed electrically photosensitive particles (in the case of conventional electrophoretic migration imaging) or the unexposed electrically photosensitive particles (in the case of the electrophoretic migration imaging process described in the above-noted Groner patent) so that the image formed on one electrode surface is composed ideally of electrically photosensitive particles of one charge polarity, either negative or positive, and the image formed on the opposite polarity electrode surface is composed ideally of electrically photosensitive particles having the opposite charge polarity, either positive or negative respectively.

In any case, regardless of the particular electrophoretic migration imaging process employed, it is apparent that an essential component of any such process is the electrically photosensitive particles. And, of course, to obtain an easy-to-read, visible image it is important that these electrically photosensitive particles be colored, as well as electrically photosensitive. Accordingly, a continuing effort is underway to find particles which possess both useful levels of electrical photosensitivity and which exhibit good colorant properties. Thus, various types of electrically photosensitive materials are disclosed for use in electrophoretic migration imaging processes, for example, in U.S. Pat. Nos. 2,758,939 by Sugarman, 2,940,847 by Kaprelian, and 3,384,488 and 3,615,558 by Tulagin et al., noted hereinabove.

Many of the pigment materials known to be useful in migration imaging processes form images in which this pigment is present in a crystalline form. Such images suffer from low light absorption and low color saturation.

SUMMARY OF THE INVENTION

In accord with the present invention, a group of materials has been discovered which are useful in electrophoretic migration imaging dispersions, images and processes.

Moreover, the materials of the present invention unexpectedly form images which can be dissolved into a polymer coated receiving element resulting in images having excellent color saturation, density and resolution. Useful materials according to this invention have the following structure:

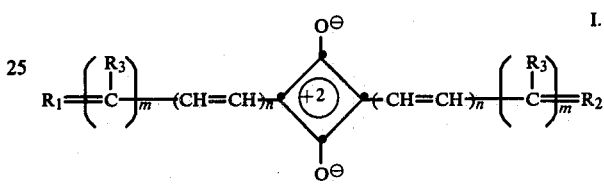

wherein $R_1$ and $R_2$ which may be the same or different, represent a monovalent or divalent substituted or unsubstituted 5 to 13 member heterocyclic nucleus or substituted or unsubstituted 5 to 10 member saturated or unsaturated carbocyclic nucleus and said hetero atom is selected from the group consisting of O and N;

$R_3$ represents H, alkyl, aryl, or cyano and carboxyesters;

m represents 0 or 1;

n represents 0, 1, 2 or 3; and said substituted $R_1$ and $R_2$ substituents are selected from the group consisting of alkyl, hydroxy, phenyl, oxo, benzyl, carbamoyl, acetamido, nitro, piperidinyl, chloro, substituted amino, e.g. alkyl amino or hydroxyalkylamino and hydrogen. Crystalline materials having one of these structures show high photosensitivity in migration imaging processes. Yellow, magenta or cyan materials can be formed by the appropriate choice of $R_1$ and $R_2$, as well as the substituents for $R_1$ and $R_2$.

Unless stated otherwise, alkyl refers to aliphatic hydrocarbon groups of 1–20 carbon atoms such as methyl, ethyl, propyl, isopropyl, butyl, heptyl, dodecyl, octadecyl, etc. Aryl refers to aromatic ring groups of 6–20 carbons such as phenyl, naphthyl, anthryl or to alkyl or aryl substituted aryl groups such as tolyl, ethylphenyl, biphenylyl, etc.

The materials of this invention having a structure according to formula I can resonate to:

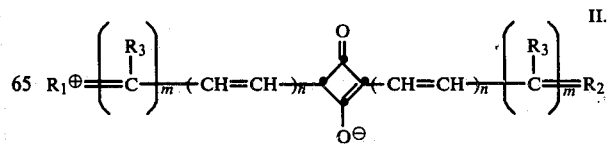

in which the valence bonds are shifted to form a dipole wherein one part of the molecule is electronically negative, and another part is electronically positive. These structures are single representations of a resonating compound. Resonating compounds as is well known, have multiple structures. The materials of this invention are drawn and named according to structure I for convenience. It will be understood however that according to nomenclature rules a "yl" ending on chemical moieties represented by $R_1$ and $R_2$ in structure I to indicate single bonding will be changed to an "ylidene" ending to indicate double bonding and vice versa. In the case of ring systems, an aromatic "phenyl" moiety will resonate to a cyclohexadienylidene since double bonds are also shifted within the ring. An unsaturated ring system can resonate in whole or part to form in whole or in part a saturated ring e.g. forming an ionic moiety within the ring such as indole to indolium, or forming a shift in substitutive protons e.g. "hydroxy phenyl" to oxo substituted cyclohexadiene and vice versa.

When used in an electrophoretic migration imaging process, charge-bearing, electrically photosensitive particles formulated from Formula I materials are positioned between two spaced electrodes. While so positioned between the spaced electrodes, the photosensitive particles are subjected to an electric field and exposed to a pattern of activating radiation. As a consequence, the charge-bearing, electrically photosensitive particles undergo a radiation-induced variation in their charge polarity and migrate to one or the other of the electrode surfaces to form on at least one of these electrodes an image pattern representing a positive-sense or negative-sense image of the original radiation exposure pattern.

BRIEF DESCRIPTION OF THE DRAWINGS

The FIGURE represents diagrammatically a typical imaging apparatus for carrying out the electrophoretic migration imaging process of the invention.

DESCRIPTION OF THE PREFERRED EMBODIMENTS

Figure 1:
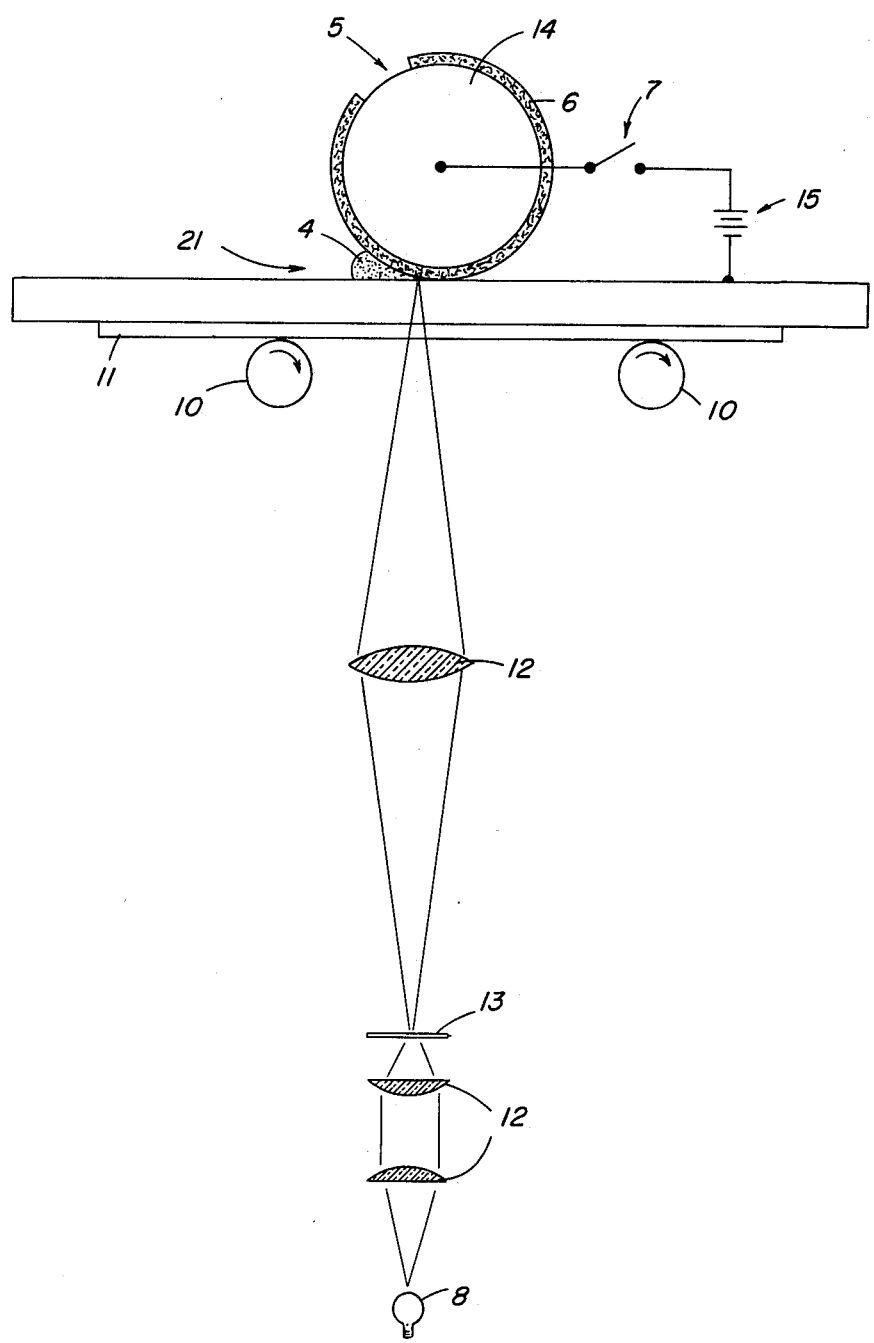

In accordance with the preferred embodiment of the present invention there is provided a group of materials which are useful in electrophoretic migration imaging processes. Said materials have the structure according to general Formula I wherein:

$R_1$ and $R_2$ which may be the same or different, represent for example:
phenyl, naphthyl, 1-azulenyl, anilino, 9-julolidinyl, 2-indolyl, 3-indolyl, 3-indolizinyl, 2-indolinylidene, 2-pyrrolyl, 3-pyrrolyl, 2-pyranylidene, 4-pyrazolinyl, 5-pyrimidinyl, 2-quinolinylidene, 6-quinolinyl, 2-benzimidazolinylidene, 2-thienyl, and n is zero.

In this preferred embodiment, $R_3$, m and n are as previously defined.

In general the materials of Formula I which have been found to be electrophotosensitive tend to exhibit a maximum absorption wavelength, λmax, within the range of from about 420 to about 750 nm. A variety of different materials within the class defined by Formula I have been tested and found to exhibit useful levels of electrical photosensitivity in electrophoretic migration imaging processes.

Also the materials of Formula I are substantially insoluble in conventional organic solvents. This property is advantageous in electrophoretic migration imaging processes, particularly in those embodiments of such processes wherein the electrically photosensitive material is dispersed in particulate form in an electrically insulating carrier such as conventional aliphatic hydrocarbon liquid to form an electrophoretic migration imaging suspension.

Although said materials are substantially insoluble in conventional organic solvents, they possess the unexpected property of being soluble in certain polymers used as coatings for image receiving elements. Hence the materials of the present invention may be dissolved into the polymer coating of such receiving elements thereby resulting in images having much better color saturation, density and resolution than obtainable with many of the known insoluble electrophotosensitive materials.

A partial listing of representative such materials is included in Table I. The materials of this invention can be prepared according to known methods as disclosed, for example, in Treibs and Jacob, *Angew. Chem. Internat. Ed.*, 4, 694 (1965); Sprenger and Ziegenbein, ibid., 5, 894 (1966); and Treibs and Jacob, *Leibig's Ann. Chem.*, 712, 123–137 (1968). Generally squaric acid is reacted with the desired carbocyclic or heterocyclic compound in a suitable solvent with heating. The product is isolated by cooling the reaction mixture to obtain crystals or by adding thereto a nonsolvent for the dye.

TABLE I

| Number | Material | Color |
|---|---|---|
| 1 | 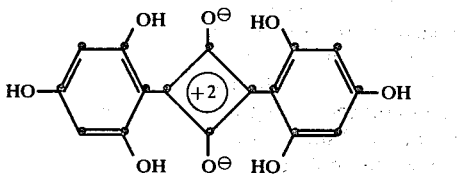 | Brown |

TABLE I-continued

| Number | Material | Color |
|---|---|---|
| 2 | (structure: bis-isopropyl-methyl-azulenyl squarate dianion complex) | Green |
| 3 | (structure: bis(diphenyl-pyranylidene-methine) squarate complex) | Green-Blue |
| 4 | (structure: bis(julolidinyl) squarate complex) | Cyan |
| 5 | (structure: bis(methyl-phenyl-pyrazolone) squarate complex) | Red |
| 6 | (structure: bis(dimethylaminomethyl-dimethyl) squarate complex) | Blue-Purple |
| 7 | (structure: tetra(ureido-carbonyl) squarate complex) | Orange |
| 8 | (structure: bis(benzimidazolinylidene-cyanomethyl) squarate complex) | Magenta |

TABLE I-continued

| Number | Material | Color |
|---|---|---|
| 9 | (structure) | Blue |
| 10 | (structure) | Purple |
| 11 | (structure) | Blue |
| 12 | (structure) | Blue-Purple |
| 13 | (structure) | Blue |
| 14 | (structure) | Blue |
| 15 | (structure) | Green |

TABLE I-continued

| Number | Material | Color |
|---|---|---|
| 16 | (structure) | Green-Blue |
| 17 | (structure) | Blue-Purple |
| 18 | (structure) | Blue |
| 19 | (structure) | Blue |
| 20 | (structure) | Green-Blue |
| 21 | (structure) | Purple |
| 22 | (structure) | Blue |

TABLE I-continued

| Number | Material | Color |
|---|---|---|
| 23 | | Blue |
| 24 | | Orange |
| 25 | | Blue-Green |
| 26 | | Blue |
| 27 | | Blue |
| 28 | | Blue |
| 29 | | Blue |

TABLE I-continued

| Number | Material | Color |
|---|---|---|
| 30 | 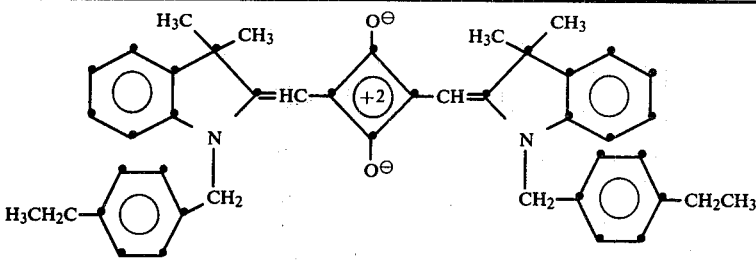 | Green-Blue |

As indicated hereinabove, the electrically photosensitive material described herein is useful in the preparation of the electrically photosensitive imaging particles used in electrophoretic migration imaging processes. In general, electrically photosensitive particles useful in such processes have an average particle size within the range of from about 0.01 micron to about 20 microns, preferably from about 0.01 to about 5 microns. Typically, these particles are composed of one or more colorant materials such as the colorant materials described in the present invention. However, these electrically photosensitive particles may also contain various non-photosensitive materials such as electrically insulating polymers, charge control agents, various organic and inorganic fillers, as well as various additional dyes or pigment materials to change or enhance various colorant and physical properties of the electrically photosensitive particle. In addition, such electrically photosensitive particles may contain other photosensitive materials such as various sensitizing dyes and/or chemical sensitizers to alter or enhance their response characteristics to activating radiation.

When used in an electrophoretic migration imaging process in accord with the present invention, the electrically photosensitive materials described in Table I, hereinabove, are typically positioned in particulate form, between two or more spaced electrodes, one or both of which typically are transparent to radiation to which the electrically photosensitive material is light-sensitive, i.e., activating radiation. Although the electrically photosensitive material, in particulate form, may be dispersed simply as a dry powder between two spaced electrodes and then subjected to a typical electrophoretic migration imaging operation such as that described in U.S. Pat. No. 2,758,939 by Sugarman, it is more typical to disperse the electrically photosensitive particulate material in an electrically insulating carrier, such as an electrically insulating liquid, or an electrically insulating, liquefiable matrix material, such as a heat- and/or solvent-softenable polymeric material or a thixoptropic polymeric material. Typically, when one employs such a dispersion of electrically photosensitive particulate material and electrically insulating carrier material between the spaced electrodes of an electrophoretic migration imaging system, it is conventional to employ from about 0.05 part to about 2.0 parts of electrically photosensitive particulate material for each 10 parts by weight of electrically insulating carrier material.

As indicated above, when the electrically photosensitive particles used in the present invention are dispersed in an electrically insulating carrier material, such carrier material may assume a variety of physical forms and may be selected from a variety of different materials. For example, the carrier material may be a matrix of an electrically insulating, normally solid polymeric material capable of being softened or liquefied upon application of heat, solvent, and/or pressure so that the electrically photosensitive particulate material dispersed therein can migrate through the matrix. In another, more typical embodiment of the invention, the carrier material can comprise an electrically insulating liquid such as decane, paraffin, Sohio Oderless Solvent 3440 (a kerosene fraction marketed by the Standard Oil Company, Ohio), various isoparaffinic hydrocarbon liquids such as those sold under the trademark Isopar G by Exxon Corporation and having a boiling point in the range of 145° C. to 186° C., various halogenated hydrocarbons such as carbon tetrachloride, trichloromonofluoromethane, and the like, various alkylated aromatic hydrocarbon liquids such as the alkylated benzenes, for example, xylenes, and other alkylated aromatic hydrocarbons such as are described in U.S. Pat. No. 2,899,335. An example of one such useful alkylated aromatic hydrocarbon liquid which is commercially available in Solvesso 100 made by Exxon Corporation. Solvesso 100 has a boiling point in the range of about 157° C. to about 177° C. and is composed of 9 percent dialkyl benzenes, 37 percent trialkyl benzenes, and 4 percent aliphatics. Typically, whether solid or liquid at normal room temperatures, i.e., about 22° C., the electrically insulating carrier material used in the present invention is a material having a resistivity greater than about $10^9$ ohm-cm, preferably greater than about $10^{12}$ ohm-cm. When the electrically photosensitive particles formed from the materials of the present invention are incorporated in a carrier material, such as one of the above-described electrically insulating liquids, various other addenda may also be incorporated in the resulting imaging suspension. For example, various charge control agents may be incorporated in such a suspension to improve the uniformity of charge polarity of the electrically photosensitive particles dispersed in the liquid suspension. Such charge control agents are well known in the field of liquid electrographic developer compositions where they are employed for purposes substantially similar to that described herein. Thus, extensive discussion of the materials herein is deemed unnecessary. These materials are typically polymeric materials incorporated by admixture thereof into the liquid carrier vehicle of the suspension. In addition to, and possibly related to, the aforementioned enhancement of uniform charge polarity, it has been found that the charge control agents often provide more stable suspensions, i.e., suspensions which exhibit substantially less settling out of the dispersed photosensitive particles.

In addition to the foregoing charge control agent materials, various polymeric binder materials such as various natural, semi-synthetic or synthetic resins, may be dispersed or dissolved in the electrically insulating carrier to serve as a fixing material for the final photosensitive particle image formed on one of the spaced electrodes used in electrophoretic migration imaging systems. Here again, the use of such fixing addenda is conventional and well known in the closely related art of liquid electrographic developer compositions so that extended discussion thereof is unnecessary herein.

The process of the present invention will be described in more detail with reference to the accompanying drawing, FIG. 1, which illustrates a typical apparatus which employs the electrophoretic migration imaging process of the invention.

FIG. 1 shows a transparent electrode 1 supported by two rubber drive rollers 10 capable of imparting a translating motion via original image 11 to electrode 1 in the direction of the arrow. Electrode 1 may be composed of a layer of optically transparent material, such as glass or an electrically insulating, transparent polymeric support such as polyethylene terephthalate, covered with a thin, optically transparent, conductive layer such as tin oxide, indium oxide, nickel, and the like. Optionally, depending upon the particular type of electrophoretic migration imaging process desired, the surface of electrode 1 may bear a "dark charge exchange" material, such as a solid solution of an electrically insulating polymer and 2,4,7,trinitro-9-fluorenone as described by Groner in U.S. Pat. No. 3,976,485 issued Aug. 24, 1976.

Spaced opposite electrode 1 and in pressure contact therewith is a second electrode 5, an idler roller which serves as a counter electrode to electrode 1 for producing the electric field used in the electrophoretic migration imaging process. Typically, electrode 5 has on the surface thereof a thin, electrically insulating layer 6. Electrode 5 is connected to one side of the power source 15 by switch 7. The opposite side of the power source 15 is connected to electrode 1 so that as an exposure takes place, switch 7 is closed and an electric field is applied to the electrically photosensitive particulate material 4 which is positioned between electrodes 1 and 5. Typically, electrically photosensitive particulate material 4 is dispersed in an electrically insulating carrier material such as described hereinabove.

The electrically photosensitive particulate material 4 may be positioned between electrodes 1 and 5 by applying material 4 to either or both of the surfaces of electrodes 1 and 5 prior to the imaging process or by injecting electrically photosensitive imaging material 4 between electrodes 1 and 5 during the electrophoretic migration imaging process.

As shown in FIG. 1, exposure of electrically photosensitive particulate material 4 takes place by use of an exposure system consisting of light source 8, an original image 11 to be reproduced, such as a photographic transparency, a lens system 12, and any necessary or desirable radiation filters 13, such as color filters, whereby electrically photosensitive material 4 is irradiated with a pattern of activating radiation corresponding to original image 11. Although the electrophoretic migration imaging system represented in FIG. 1 shows electrode 1 to be transparent to activating radiation from light source 8, it is possible to irradiate electrically photosensitive particulate material 4 in the nip 21 between electrodes 1 and 5 without either of electrodes 1 or 5 being transparent. In such a system, although not shown in FIG. 1, the exposure source 8 and lens system 12 is arranged so that image material 4 is exposed in the nip or gap 21 between electrodes 1 and 5.

As shown in FIG. 1, electrode 5 is a roller electrode having a conductive core 14 connected to power source 15. The core is in turn covered with a layer of insulating material 6, for example, baryta paper. Insulating material 6 serves to prevent or at least substantially reduce the capability of electrically photosensitive particulate material 4 to undergo a radiation induced charge alteration upon interaction with electrode 5. Hence, the term "blocking electrode" may be used, as is conventional in the art of electrophoretic migration imaging, to refer to electrode 5.

Although electrode 5 is shown as a roller electrode and electrode 1 is shown as essentially a translatable, flat plate electrode in FIG. 1, either or both of these electrodes may assume a variety of different shapes such as a web electrode, rotating drum electrode, plate electrode, and the like as is well known in the field of electrophoretic migration imaging.

In general, during a typical electrophoretic migration imaging process wherein electrically photosensitive material 4 is dispersed in an electrically insulating, liquid carrier, electrodes 1 and 5 are spaced such that they are in pressure contact or very close to one another during the electrophoretic migration imaging process, e.g., less than 50 microns apart. However, where electrically photosensitive particulate material 4 is dispersed simply in an air gap between electrodes 1 and 5 or in a carrier such as a layer of heat-softenable or other liquefiable material coated as a separate layer on electrode 1 and/or 5, these electrodes may be spaced more than 50 microns apart during the imaging process.

The strength of the electric field imposed between electrodes 1 and 5 during the electrophoretic migration imaging process of the present invention may vary considerably; however, it has generally been found that optimum image density and resolution are obtained by increasing the field strength to as high a level as possible without causing electrical breakdown of the carrier medium in the electrode gap. For example, when electrically insulating liquids such as isoparaffinic hydrocarbons are used as the carrier in the imaging apparatus of FIG. 1, the applied voltage across electrodes 1 and 5 typically is within the range of from about 100 volts to about 4 kilovolts or higher.

As explained hereinabove, image formation occurs in electrophoretic migration imaging processes as the result of the combined action of activating radiation and electric field on the electrically photosensitive particulate material 4 disposed between electrodes 1 and 5 in the attached drawing. Typically, for best results, field application and exposure to activating radiation occur concurrently. However, as would be expected, by appropriate selection of various process parameters such as field strength, activating radiation intensity, incorporation of suitable light sensitive addenda in or together with the electrically photosensitive particles formed from the material of Formula I, e.g., by incorporation of a persistent photoconductive material, and the like, it is possible to alter the timing of the exposure and field application events so that one may use sequential exposure and field application events rather than concurrent field application and exposure events.

When disposed between imaging electrodes 1 and 5 of FIG. 1, electrically photosensitive particulate material 4 exhibits an electrostatic charge polarity, either as a result of triboelectric interaction of the particles or as a result of the particles interacting with the carrier material in which they are dispersed, for example, an electrically insulating liquid, such as occurs in conventional liquid electrographic developing compositions composed of toner particles which acquire a charge upon being dispersed in an electrically insulating carrier liquid.

Image discrimination occurs in the electrophoretic migration imaging process of the present invention as a result of the combined application of electric field and activating radiation on the electrically photosensitive particulate material dispersed between electrodes 1 and 5 of the apparatus shown in FIG. 1. That is, in a typical imaging operation, upon application of an electric field between electrodes 1 and 5, the particles 4 of charge-bearing, electrically photosensitive material are attracted in the dark to either electrodes 1 or 5, depending upon which of these electrodes has a polarity opposite to that of the original charge polarity acquired by the electrically photosensitive particles. And, upon exposing particles 4 to activating electromagnetic radiation, it is theorized that there occurs neutralization or reversal of the charge polarity associated with either the exposed or unexposed particles. In typical electrophoretic migration imaging systems wherein electrode 1 bears a conductive surface, the exposed, electrically photosensitive particles 4, upon coming into electrical contact with such conductive surface, undergo an alteration (usually a reversal) of their original charge polarity as a result of the combined application of electric field and activating radiation. Alternatively, in the case of photoimmobilized electrophoretic recording (PIER), wherein the surface of electrode 1 bears a dark charge exchange material as described by Groner in aforementioned U.S. Pat. No. 3,976,485, one obtains reversal of the charge polarity of the unexposed particles, while maintaining the original charge polarity of the exposed electrically photosensitive particles, as these particles come into electrical contact with the dark charge exchange surface of electrode 1. In any case, upon the application of electric field and activating radiation to electrically photosensitive particulate material 4 disposed between electrodes 1 and 5 of the apparatus shown in FIG. 1, one can effectively obtain image discrimination so that an image pattern is formed by the electrically photosensitive particles which corresponds to the original pattern of activating radiation. Typically, using the apparatus shown in FIG. 1, one obtains a visible image on the surface of electrode 1 and a complementary image pattern on the surface of electrode 5.

Subsequent to the application of the electric field and exposure to activating radiation, the images which are formed on the surface of electrodes 1 and/or 5 of the apparatus shown in FIG. 1 may be temporarily or permanently fixed to these electrodes or may be transferred to a final image receiving element. Fixing of the final particle image can be effected by various techniques, for example, by applying a resinous coating over the surface of the image bearing substrate. For example, if electrically photosensitive particles 4 are dispersed in a liquid carrier between electrodes 1 and 5, one may fix the image or images formed on the surface of electrodes 1 and/or 5 by incorporating a polymeric binder material in the carrier liquid. Many such binders (which are well known for use in liquid electrophotographic liquid developers) are known to acquire a charge polarity upon being admixed in a carrier liquid and therefore will, themselves, electrophoretically migrate to the surface of one or the other of the electrodes. Alternatively, a coating of a resinous binder (which has been admixed in the carrier liquid), may be formed on the surfaces of electrodes 1 and/or 5 upon evaporation of the liquid carrier.

The electrically photosensitive colorant material of Formula I may be used to form monochrome images, or the material may be admixed with other electrically photosensitive material of proper color and photosensitivity and used to form polychrome images. Many of the electrically photosensitive colorant materials having Formula I have especially useful hues which make them particularly suited for use in polychrome imaging processes which employ a mixture of two or more differently colored electrically photosensitive particles. When such a mixture of multicolored electrically photosensitive particles is formed, for example, in an electrically insulating carrier liquid, this liquid mixture of particulate material exhibits a black coloration. Preferably, the specific cyan, magenta, and yellow particles selected for use in such a polychrome imaging process are chosen so that their spectral response curves do not appreciably overlap whereby color separation and subtractive multicolor image reproduction can be achieved.

As stated hereinbefore, the materials of the present invention may be dissolved into certain polymeric coated receiving elements. Said materials may be dissolved into the polymeric coating by using image fixing techniques. For an example, after the image is formed on a suitably polymer coated receiving element according to the previously described migration imaging process, the image bearing polymer coated receiving element may be heated on a heating block at about 160° C. This heating causes the image to dissolve into the polymer coating of the receiver element. Alternatively, the image may be dissolved in the polymer coating by treating the image with the vapors of an appropriate solvent.

The following examples illustrate the utility of the Formula I materials in electrophoretic migration imaging processes.

EXAMPLES 1–30

Imaging Apparatus

An imaging apparatus was used in each of the following examples to carry out the electrophoretic migration imaging process described herein. This apparatus was a device of the type illustrated in FIG. 1. In this apparatus, a translating film base having a conductive coating of 0.1 optical density cermet (Cr.SiO) served as electrode 1 and was in pressure contact with a 10 centimeter diameter aluminum roller 14 covered with dielectric paper coated with a polymeric receiver served as electrode 5. Plate 1 was supported by two 2.8 cm. diameter rubber drive rollers 10 positioned beneath plate 1 such that a 2.5 cm. opening, symmetric with the axis of the aluminum roller 14, existed to allow exposure of electrically photosensitive particles 4 to activating radiation. The original transparency 11 to be reproduced was taped to the back side of film plate 1.

The original transparency to be reproduced consisted of adjacent strips of clear (W0), red (W29), green (W61) and blue (W47B) filters. The light source consisted of a Kodak Ektagraphic AV434A Carousel Projector with a 1000 watt Xenon Lamp. The light was modulated with a Kodak 0.3 neutral density silver step tablet. The residence time in the action or exposure zone was 10 milliseconds. The log of the light intensity (Log I) was as follows:

| Filters | Log I erg/cm²/sec. |
|---|---|
| W0 Clear | 5.34 |
| W29 Red | 4.18 |
| W61 Green | 4.17 |
| W47B Blue | 4.15 |

The voltage between the electrode 5 and film plate 1 was about 2 kv. Film plate 1 was negatively charged in the case where electrically photosensitive particulate material 4 carried a positive electrostatic charge, and film plate 1 was positively charged in the case where electrically photosensitive electrostatically charged particles were negatively charged. The translational speed of film plate 1 was about 25 cm. per second. In the following examples, image formation occurs on the surfaces of film plate 1 and electrode 5 after simultaneous application of light exposure and electric field to each electrically photosensitive material evaluated for use. Electrically photosensitive particulate material 4 was admixed with a liquid carrier as described below to form a liquid imaging dispersion which was placed in nip 21 between the electrodes 1 and 5. If the material being evaluated for use as material 4 possessed a useful level of electrical photosensitivity, one obtained a negative-appearing image reproduction of original 11 on electrode 5 and a complementary image on electrode 1.

Imaging Dispersion Preparation

Imaging dispersions were prepared to evaluate each of the materials in Table I. The dispersions were prepared by first making a stock solution of the following components. The stock solution was prepared simply by combining the components.

| | |
|---|---|
| Isopar G | 2.2 g |
| Solvesso | 1.3 g |
| Piccotex 100 | 1.4 g |
| PVT (charge control agent)* | 0.1 g |
| Pigment | 0.045 g |

*Poly(vinyltoluene-co-lauryl methacrylate-co-lithium methacrylate-co-methacrylic acid) 56/40/3.6/0.4

A 5 g. aliquot of the stock solution was combined in a closed container with 0.045 g. of the Table I material to be tested and 12 g. of Hamber 440 stainless steel balls. The preparation was then milled for three hours on a point shaker.

Each of the 30 materials described in Table I was tested according to the just outlined procedures. Each of such materials were found to be electrophotosensitive as evidenced by obtaining a negative appearing image of the original on one electrode and a complementary image on the other electrode. Materials 4, 5, 6, 11, 13, 14, 15, 17, 18, 21, 22, 26, 27, 28, 29, and 30 provide images having good to excellent quality. Image quality was determined visually having regard to minimum and maximum densities, speed and color saturation.

A portion of the imaged polymer receiver element for each Table I material was heated at 160° C. for 5 seconds. The sample generally changed hue when heated in the polymer coating. Reflection spectra were taken of both the unheated and heated samples using diffuse illumination. Results are reported in Table II.

TABLE II

| Number | λmax* | % Density Change** | λmax in polymer A or B*** |
|---|---|---|---|
| 1 | 440 | 180 | 577(B) |
| 2 | ~700 | 308 | >700(B) |
| 3 | 656 | 8 | 532(B) |
| 4 | 747 | 250 | 674(B) |
| 5 | 477 | 30 | 508(A) |
| 6 | 584 | 22 | 539(B) |
| 7 | 504 | 19 | 500(A) |
| 8 | 564 | 13 | 560(A) |
| 9 | 696 | 127 | 675(A) |
| 10 | 525 | 17 | 514(A) |
| 11 | 656 | 38 | 628(B) |
| 12 | 555 | 133 | 645(B) |
| 13 | 636 | 25 | 626(B) |
| 14 | 630 | 235 | 554(A) |
| 15 | 766 | 104 | >700(A) |
| 16 | 714 | 68 | 645(B) |
| 17 | 611 | 41 | 594(B) |
| 18 | 615 | 78 | 645(B) |
| 19 | 440 | 261 | 466(A) |
| 20 | 640 | 42 | 637(B) |
| 21 | >700 | 21 | 656(B) |
| 22 | 555 | 18 | 555(B) |
| 23 | 640 | 37 | 640(B) |
| 24 | 698 | 84 | 637(B) |
| 25 | 473 | 80 | 468(B) |
| 26 | 610 | 41 | 593(B) |
| 27 | 655 | 214 | 639(B) |
| 28 | 610 | 1700 | 640(B) |
| 29 | 553 | 61 | 638(B) |

*Wavelength of maximum absorption for unheated crystalline dyes.
**Percent increase in optical density (color reflection measured through appropriate filters) between heated and unheated images.
***Wavelength of maximum absorption for heated dye in polymer A or polymer B. Polymer A is cyclohexane-1,4-bis(oxyethanol)/succinic acid/p-benzenediacrylic acid/N,N'-bis(4-carboxyphenyl)sebacamide/imino-3,3'-bis(sulfonylbenzoic acid)-copolyester.(55:20:10:15). Polymer B is ethyleneglycol/cyclohexane dimethanol/-terephthalic acid copolyester (70:30).

The invention has been described in detail with particular reference to certain preferred embodiments thereof, but it will be understood that variations and modifications can be effected within the spirit and scope of the invention.

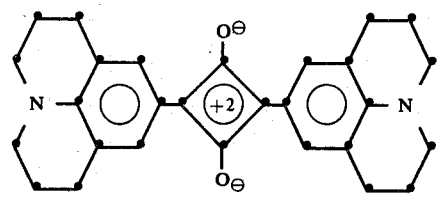

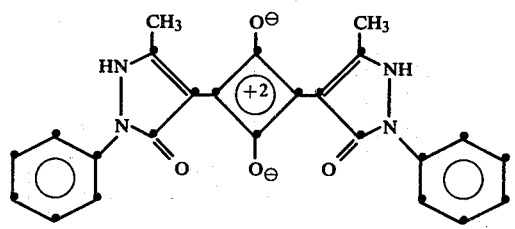

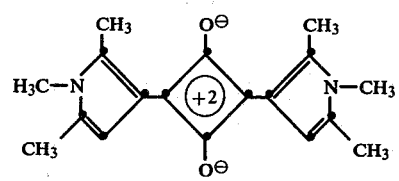

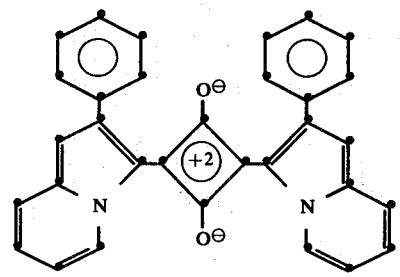

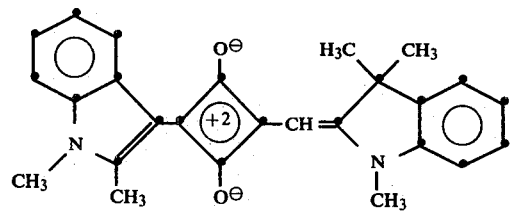

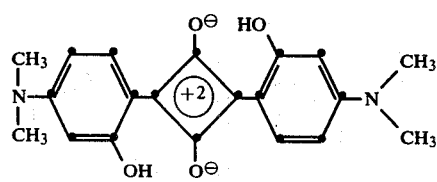

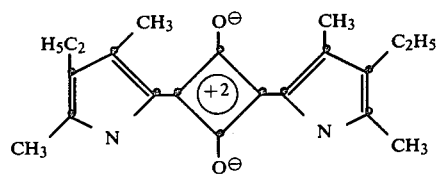
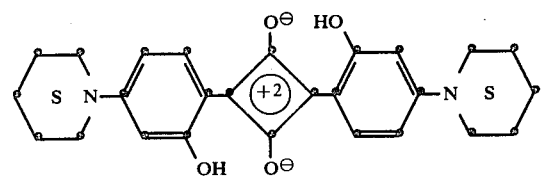
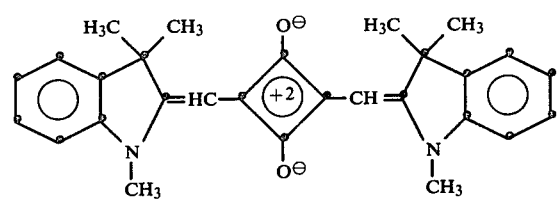
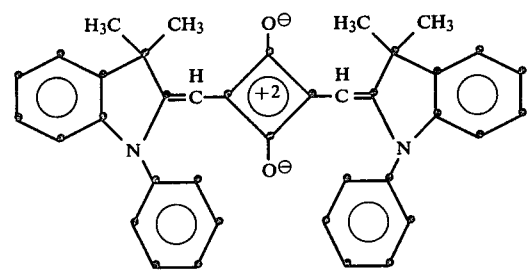
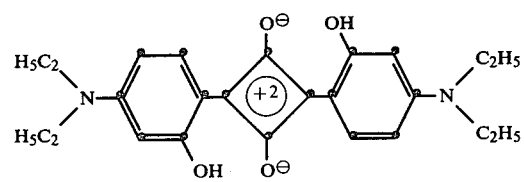
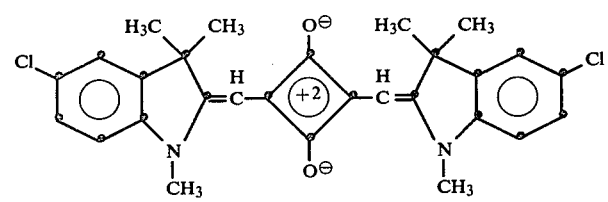
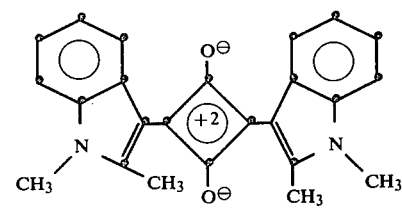
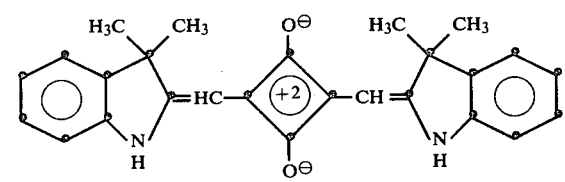

-continued
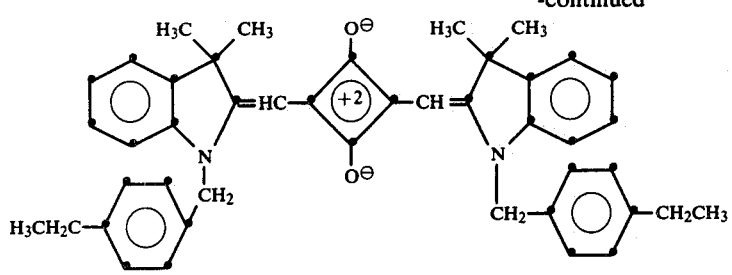
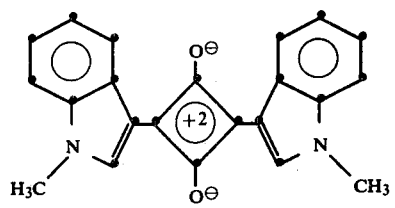

We claim:

1. An electrophoretic migration imaging process which comprises subjecting an electrically photosensitive colorant material positioned between at least two electrodes to an applied electric field and exposing said materials to an image pattern of radiation to which the material is photosensitive, thereby obtaining image formation on at least one of said electrodes, characterized in that at least a portion of said electrophotosensitive material has the structure:

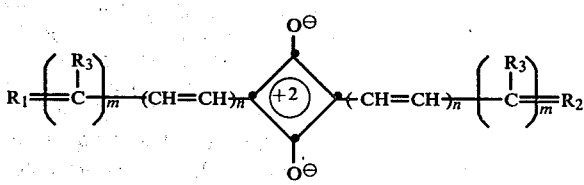

wherein $R_1$ and $R_2$, which may be the same or different, represent a monovalent or divalent substituted or unsubstituted 5 to 13 member heterocyclic nucleus or a substituted or unsubstituted 5 to 10 member saturated or unsaturated carbocyclic nucleus and said hetero atom is selected from the group consisting of O and N;

$R_3$ represents H, alkyl, aryl, or cyano and carboxy-esters;

m represents 0 or 1; and n represents 0, 1, 2 or 3; and said substituted $R_1$ and $R_2$ substituents are selected from the group consisting of alkyl, hydroxy, phenyl, oxo, benzyl, carbamoyl, acetamido, nitro, piperidinyl, halo, and substituted amino.

2. A process according to claim 1 wherein $R_1$ and $R_2$ which may be the same or different, represent:

phenyl, naphthyl, 1-azulenyl, anilino, 9-julolidinyl, 2-indolyl, 3-indolyl, 3-indolizinyl, 2-indolinylidene, 2-pyrrolyl, 3-pyrrolyl, 2-pyranylidene, 4-pyrazolinyl, 5-pyrimidinyl, 2-quinolinylidene, 6-quinolinyl, 2-benzimidazolinylidene, 2-thienyl, and n represents zero.

3. A process according to claim 1 wherein said material has a structure selected from the group consisting of